July 25, 1933.  U. A. WHITAKER  1,919,404
BRAKE VALVE DEVICE
Filed Jan. 9, 1930
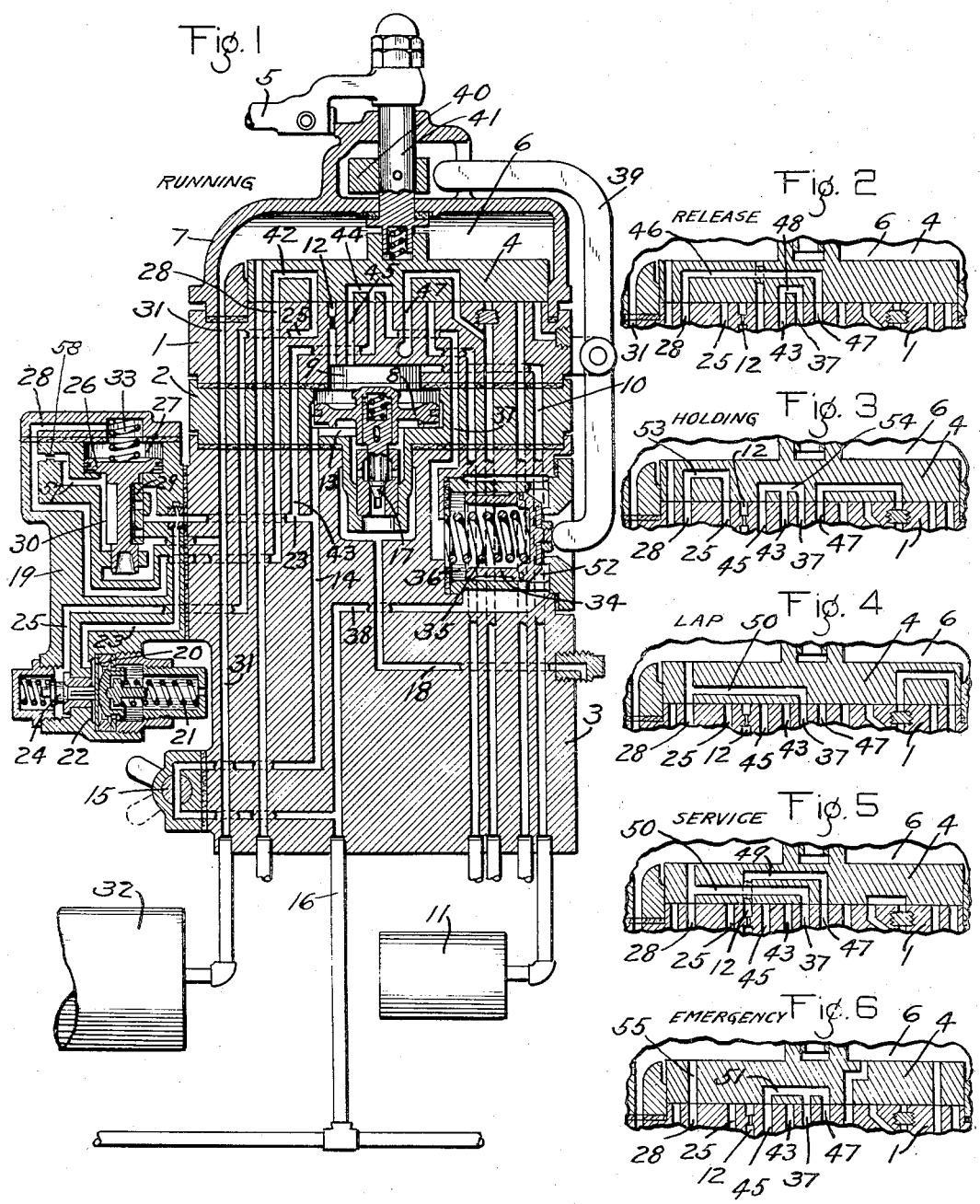
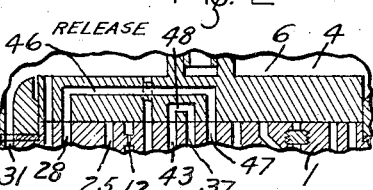
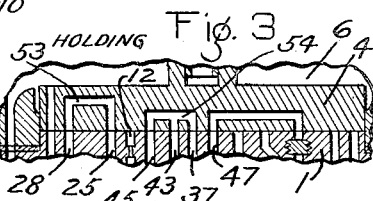
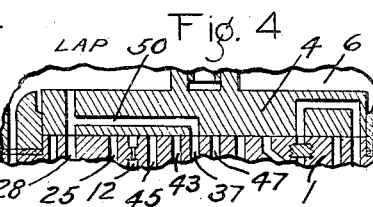
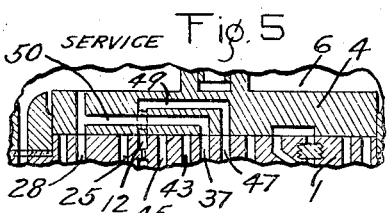
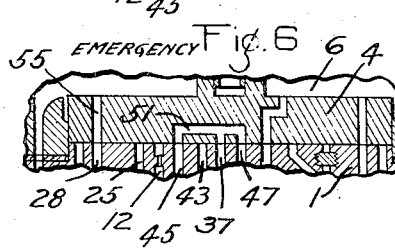
INVENTOR
UNCAS A. WHITAKER
BY
*Wm. M. Cady*
ATTORNEY Patented July 25, 1933

1,919,404

UNITED STATES PATENT OFFICE

UNCAS A. WHITAKER, OF CANTON, OHIO, ASSIGNOR TO THE WESTINGHOUSE AIR BRAKE COMPANY, OF WILMERDING, PENNSYLVANIA, A CORPORATION OF PENNSYLVANIA

BRAKE VALVE DEVICE

Application filed January 9, 1930. Serial No. 419,520.

This invention relates to fluid pressure brakes, and more particularly to an engineer's brake valve device.

The principal object of my invention is to provide a large capacity engineer's brake valve device having a minimum resistance to movement, by avoiding the use of large ports and by the use of relay valves, so that the brake valve device may be of relatively small size, with a minimum resistance to movement.

In the accompanying drawing; Figure 1 is a sectional view of an engineer's brake valve device embodying my invention, and showing the rotary valve in running position; and Figs. 2 to 6 inclusive, sectional views showing the rotary valve in the respective positions of release, holding, lap, service, and emergency.

The brake valve device may comprise casing sections 1, 2 and 3 secured together, with the usual interposed gaskets. The section 1 is provided with a valve seat for a rotary valve 4 adapted to be operated by a handle 5, the valve 4 being contained in a valve chamber 6, formed in a cover plate 7.

The casing section 2 has a piston chamber containing an equalizing piston 8, the chamber 9 at one side of the piston being connected through passage 10, with the usual equalizing reservoir 11, and said chamber having a passage 12, leading to the seat of rotary valve 4. The chamber 13 at the opposite side of the piston is connected to a passage 14, which leads, through a cut-out cock 15, to the usual brake pipe 16. The piston 8 is adapted to operate a discharge valve 17, which controls the venting of fluid from chamber 13 and the brake pipe 16 to an atmospheric exhaust passage 18.

A feed valve device, which is also utilized as a relay valve, in effecting the supply of fluid from the main reservoir to the brake pipe in full release position, is associated with the brake valve device, and comprises a casing 19 containing a regulating portion and a fluid pressure supply portion. The regulating portion comprises a flexible diaphragm 20 subject on one side to the pressure of an adjustable spring 21 and having the chamber 22 at the opposite side connected to a passage 23, which connects with the brake pipe passage 14.

The diaphragm 20 is adapted to operate a valve 24, which controls communication from chamber 22 to a passage 25 leading to the seat of rotary valve 4. The supply portion of the feed valve device, comprises a piston 26 contained in piston chamber 27, which chamber is connected to passage 28, leading to the seat of rotary valve 4. The piston 26 is adapted to operate a supply valve 29 contained in valve chamber 30, said chamber being connected to a passage 31, which communicates with the usual main reservoir 32.

The piston 26 is biased to its closed position by a spring 33 and when the slide valve 29 is moved to its open position, the valve chamber 30 is connected to passage 23 through ports in the valve.

Mounted in casing section 3 is an emergency vent valve 34, subject to the pressure of a spring 35, tending to seat the valve. The spring chamber 36 is connected to a passage 37, leading to the seat of the rotary valve 4. The vent valve 34 controls the venting of fluid from the brake pipe through a passage 38 to the atmosphere, by way of a large port opening.

For assisting in the operation of the vent valve 34, a lever 39 is provided, which is fulcrumed at an intermediate point on the casing section 1. One end of the lever is turned inwardly and is adapted to engage the valve 34. The other end of the lever is also bent inwardly and is adapted to be engaged by a cam 40, which is secured to the rotary valve operating stem 41.

In the running position of the brake valve device, a cavity 42 in the rotary valve connects passage 25 with passage 28, so that the valve 24 of the regulating portion of the feed valve device is connected up to control the pressure in piston chamber 27 of the supply portion.

When the brake pipe pressure, acting in diaphragm chamber 22, as supplied through passage 23, falls below a predetermined degree, the diaphragm 20 operates to unseat the valve 24, so that fluid under pressure is vented from piston chamber 27, to the brake pipe. The piston 26 then operates to shift the slide valve 29 to the position in which fluid under pressure is supplied from the main reservoir to the brake pipe. The pressure in the brake pipe is thus maintained at the standard pressure carried in the brake pipe while the brake valve device remains in running position.

The equalizing piston chamber 9 and the equalizing reservoir 11 are charged to brake pipe pressure by way of passage 43, cavity 44 in rotary valve 4 and passage 45, and passage 37 being connected to cavity 44 in running position, the chamber 36 of the vent valve device 34 is charged with fluid at brake pipe pressure, so as to assist the spring 35 in maintaining the vent valve tightly seated.

In the release position of the brake valve device, as shown in Fig. 2, passage 28 is connected through a cavity 46 in the rotary valve 4 with an atmospheric exhaust port 47, so that piston chamber 27 of the supply portion of the feed valve device is vented to the atmosphere. The piston 26 is therefore operated to shift the slide valve 29 to its supply position, so that fluid at main reservoir pressure is supplied to the brake pipe, so long as the brake valve remains in release position. The supply portion of the feed valve device consequently serves as a relay valve for controlling the supply of fluid under pressure from the main reservoir to the brake pipe in full release position. In release position, a cavity 48 in the rotary valve connects passages 43 and 37, so that the spring chamber 36 of the vent valve 34 is maintained charged with fluid at brake pipe pressure to hold the valve seated.

In service position, as shown in Fig. 5, the passage 12 is connected, through cavity 49 in the rotary valve 4 with exhaust port 47, so that fluid under pressure is vented from the equalizing piston chamber 9 and the equalizing reservoir 11. The equalizing piston 8 is then operated to unseat the discharge valve 17, so that fluid under pressure is vented from the brake pipe to the atmosphere to effect a gradual reduction in brake pipe pressure in the usual manner.

In service position, fluid at main reservoir pressure is supplied to the spring chamber 36 of the vent valve 34, from the rotary valve chamber 6, through a cavity 50 in the rotary valve 4.

In emergency position, passage 37 is connected, through cavity 51 in the rotary valve 4, with exhaust port 47, so that the spring chamber 36 of the vent valve 34 is vented to the atmosphere. The area of the valve 34 outside of its seat being exposed to brake pipe pressure in chamber 52, as supplied through passage 38, the valve will be shifted to the left, against the pressure of spring 35, so as to open a large atmospheric vent port to the brake pipe. Fluid under pressure is then vented from the brake pipe at a rapid rate, so as to effect a sudden emergency reduction in brake pipe pressure. In order to ensure the opening of the vent valve 34 in the emergency position of the brake valve device, in case the venting of fluid from the spring chamber 36 should fail to do so, the lever 39 is adapted to be operated by the cam 40, when the brake valve handle is turned to emergency position, so that the lever acts to mechanically shift the vent valve 34 from its seat.

In holding position of the brake valve device, as shown in Fig. 3, a cavity 53 in the rotary valve 4 connects passages 25 and 28, so that the feed valve device is connected to control the supply of fluid to the brake pipe, in order to maintain the brake pipe pressure at the standard pressure carried, in holding position. A cavity 54 in the rotary valve 4 also connects the brake pipe passage 43 with passages 37 and 45, so that the brake pipe is connected to the equalizing piston chamber 9 and to the spring chamber 36 of the vent valve 34, as in running position.

In both service and lap positions, the cavity 50 connects passage 28 to the rotary valve chamber 6, so that main reservoir pressure is supplied to the piston chamber 27 of the supply portion of the feed valve device, and thereby the feed valve device is prevented from acting in these positions, to supply fluid under pressure to the brake pipe.

In emergency position, a port 55 connects the rotary valve chamber 6 with passage 28, so that the piston chamber 27 of the supply portion of the feed valve device is supplied with fluid at main reservoir pressure to prevent the feed valve device from operating to supply fluid under pressure to the brake pipe in emergency position.

The cut-out cock 15 is so disposed that it only operates to cut off communication from the brake pipe 16 to the controlling passage 14 of the brake valve device and does not operate to cut off communication from the brake pipe, through passage 38 to the emergency vent valve 34. This makes it possible to effect an emergency application of the brakes at any time from the second locomotive, in double heading, and when the brake pipe cut-out cock 15 is in its closed position.

The supply portion of the feed valve device is provided with the usual passage 57 containing choke 58 having a restricted flow port, for charging the piston chamber 27 with fluid under pressure from valve chamber 30 and the main reservoir, so that when the regulating valve 24 closes, the fluid pressure will be built up in piston chamber 27, permitting the spring 33 to move the piston 26 and slide valve 29 to normal position.

When the rotary valve 4 is in release position, the passage 28 being connected to exhaust port 47, fluid under pressure as supplied from the valve chamber 30 through the passage 57 to passage 28 will blow out at the exhaust port 47 and thus serve as a warning port, to warn the engineer that the brake valve device is in release position.

While one illustrative embodiment of the invention has been described in detail, it is not my intention to limit its scope to that embodiment or otherwise than by the terms of the appended claims.

Having now described my invention, what

I claim as new and desire to secure by Letters Patent, is:

1. In a fluid pressure brake, the combination with a brake pipe, of a feed valve device having a fluid pressure supply portion and a regulating portion operated upon a reduction in brake pipe pressure for effecting the operation of said supply portion to supply fluid under pressure to the brake pipe, and a brake valve device having a position in which communication is established for continually venting fluid under pressure from said supply portion to the atmosphere so long as the brake valve device remains in said position to effect the operation of said supply portion to supply fluid under pressure to the brake pipe.

2. In a fluid pressure brake, the combination with a brake pipe, of valve means operated upon a reduction in fluid pressure for supplying fluid under pressure to the brake pipe, a regulating valve mechanism operated upon a reduction in brake pipe pressure for venting fluid from said valve means, and a brake valve device having a position in which fluid is continually vented from said valve means so long as the brake valve device remains in said position to effect the supply of fluid under pressure to the brake pipe.

3. In a fluid pressure brake, the combination with a brake pipe, of valve means operated upon a reduction in fluid pressure for supplying fluid under pressure to the brake pipe, a regulating valve mechanism operated upon a reduction in brake pipe pressure for venting fluid from said valve means, and a brake valve device having one position in which communication is established through which fluid is vented from said valve means by operation of said regulating portion, and another position in which said valve means is connected to the atmosphere so long as said brake valve device remains in said position.

4. In a fluid pressure brake, the combination with a brake pipe, of valve means operated upon a reduction in fluid pressure for supplying fluid under pressure to the brake pipe, a regulating valve mechanism operated upon a reduction in brake pipe pressure for venting fluid from said valve means, and a brake valve device having a running position in which communication is established for venting fluid from said valve means by operation of said regulating valve mechanism, and a release position in which fluid under pressure is directly vented from said valve means.

5. In a fluid pressure brake, the combination with a brake pipe, of valve means operated by a variation in fluid pressure for effecting a sudden reduction in brake pipe pressure, a brake valve device having an emergency position in which fluid under pressure is varied on said valve means, and mechanical means actuated by said brake valve device upon movement to emergency position for also operating said valve means.

6. In a fluid pressure brake, the combination with a brake pipe, of valve means operable to effect a sudden reduction in brake pipe pressure, a brake valve device comprising a rotatable slide valve having an emergency position and a handle for rotating said valve, a lever for operating said valve means and means operated by the rotation of said handle for actuating said lever.

7. In a fluid pressure brake, the combination with a brake pipe, of valve means operable to effect a sudden reduction in brake pipe pressure, a brake valve device comprising a rotary slide valve having an emergency position and a handle for operating said valve, a lever for operating said valve means, and a cam operated by the rotation of said handle to emergency position for actuating said lever.

8. In a fluid pressure brake, the combination with a brake pipe, of a relay valve means for supplying fluid under pressure to the brake pipe, a valve device for venting fluid under pressure from the brake pipe to effect a service reduction in brake pipe pressure, a relay valve means for venting fluid under pressure from the brake pipe to effect an emergency reduction in brake pipe pressure, a brake valve device having a release position, a service position, and an emergency position, means operative upon movement of the brake valve device to release position for effecting the operation of the first mentioned relay valve means, means operative upon movement of said brake valve device to service position for effecting the operation of said service valve device and means operative upon movement of the brake valve device to emergency position for effecting the operation of the second mentioned relay valve means.

9. In a fluid pressure brake, the combination with a brake pipe, of a relay valve means operated upon a reduction in fluid pressure for supplying fluid under pressure to the brake pipe, a service valve device for effecting a gradual reduction in brake pipe pressure, a relay valve means operated upon a reduction in fluid pressure for venting fluid under pressure from the brake pipe at an emergency rate, and a brake valve device having a rotary valve movable to a release position, a service position and to an emergency application position and having ports and passages for venting fluid under pressure from the first mentioned relay valve means in release position from the service valve device in service position and ports and passages for venting fluid under pressure from the second mentioned relay valve means in the emergency position.

UNCAS A. WHITAKER.